United States Patent [19]
Ehs

[11] Patent Number: 5,702,023
[45] Date of Patent: Dec. 30, 1997

[54] DRYING-AGENT RECEPTACLE FOR AN AIR-CONDITIONING SYSTEM

[76] Inventor: Eugen Ehs, Landshuter Allee 21, 80637, München, Germany

[21] Appl. No.: 648,875

[22] Filed: May 16, 1996

[30] Foreign Application Priority Data

Jun. 1, 1995 [DE] Germany ............ 295 09 086.3

[51] Int. Cl.$^6$ .................. B65D 6/00; F17C 13/06
[52] U.S. Cl. ............. 220/582; 220/4.07; 220/661; 220/678
[58] Field of Search .................. 220/678, 4.07, 220/411, 413, 466, 582, 4.12, 661

[56] References Cited

U.S. PATENT DOCUMENTS

| | | | |
|---|---|---|---|
| 4,788,833 | 12/1988 | Steele | 62/474 |
| 5,044,514 | 9/1991 | Portat et al. | 220/4.07 |
| 5,184,480 | 2/1993 | Kolpacke | 62/503 |
| 5,340,231 | 8/1994 | Steere et al. | 404/14 |

FOREIGN PATENT DOCUMENTS

| | | |
|---|---|---|
| A-261309 | 3/1988 | European Pat. Off. |
| A-547625 | 6/1993 | European Pat. Off. |
| A-3606029 | 8/1986 | Germany |
| U-9011384 | 10/1990 | Germany |

OTHER PUBLICATIONS

Database WPI, Week 9526; Derwent Publications Ltd., AN 95–194356 & AU-A-7590 094; S.Takechi.

Two–page data sheet; Hoeschst AG, CELSTRAN Hoechst High Chem, Celstran PP–GF 40.

Two–page data sheet; A. Schulman GmbH and Hoeschst AG, CELSTRAN Hoechst High Chem, Celstran PA66–Typen.

Primary Examiner—Joseph M. Moy
Attorney, Agent, or Firm—Nilles & Nilles SC

[57] ABSTRACT

In a drying-agent receptacle (T) for a vehicular air-conditioning system, which has a rotationally symmetric, closed interior, which consists of two receptacle components (A, B) interconnected in a connection area (V), and which is provided with integrated connection means (11), the receptacle components (A, B) are injection-moulded parts consisting of long-fibre reinforced thermoplastic material (P), and the transition (Ü) from an interior bottom (5, 5', 5") to the neighbouring internal circumferential wall (3, 3') is formed, at least in the receptacle component (A) including interior connection elements (1) of the connection area (V), in such a way that a harmonious shape without any kinks or undercut portions is obtained.

11 Claims, 1 Drawing Sheet

DRYING-AGENT RECEPTACLE FOR AN AIR-CONDITIONING SYSTEM

BACKGROUND OF THE INVENTION

1. Field of the Invention

The present invention refers to a drying-agent receptacle for use in an air-conditioning system, in particular for use in a vehicular air-conditioning system.

The drying-agent receptacle, which is integrated in a vehicular air-conditioning system, is filled with a water-absorbing substance and inserted in the coolant circuit so that moisture will permanently be extracted from the coolant. The drying-agent receptacle must be pressure- and temperature-resistant.

2. Description of the Prior Art

Formerly, drying-agent receptacles used in vehicular air-conditioning systems consisted of receptacle parts which were made from deep-drawn sheet metal and which were expensive to produce and, especially, heavy. Also aluminium and aluminium alloys were used for this purpose (German-A-36 06 029).

Primarily for reasons of weight, drying-agent receptacles consisting of metal are no longer used. In the course of the further technical development, drying-agent receptacles have become known which consist of a shape-defining interior receptacle having wound thereon glass-fibre reinforced plastic (EP-A-0 261 309) or which are provided with a stocking-shaped glass-fibre reinforced plastic coating, the G.R.P sheathing providing the necessary pressure and temperature resistance. These drying-agent receptacles are substantially less heavy than the old drying-agent receptacles. Due to the complicated production process, such G.R.P drying-agent receptacles are comparatively expensive. In addition, they are difficult to recycle. According to DE-U 90 11 384, a coupling member formed integrally with fastening ears is used in connection with a drying-agent receptacle provided with a wound fibre reinforcement. U.S. Pat. No. 4,788,833 describes a drying-agent receptacle which is assembled from components consisting of strong plastic material, such as Noryll or 420-Valox. U.S. Pat. No. 5,184,480 discloses an accumulator for vehicular air-conditioning systems whose individual components are formed parts consisting of plastic material, e.g. of polyester reinforced by glass mineral. Finally, U.S. Pat. No. 5,340,231 recommends the use of the plastic material Celstran for the basic body of road marking elements that can be driven over because this material has a high impact and compression resistance.

OBJECTS AND SUMMARY OF THE INVENTION

It is the object of the present invention to provide a drying-agent receptacle of the type described at the beginning, which, although it can be produced in a simple manner and at a low price, is able to satisfy without any difficulties the prescribed demands with regard to pressure and temperature resistance for vehicular air-conditioning systems.

This object is achieved by forming the drying-agent receptacle from two receptacle components which are interconnected in a circumferentially extending connection area to define a closed interior which is essentially symmetrical with regard to a longitudinal axis the drying-agent receptacle. The two receptacle components are interconnected in the circumferentially extending connection area by interior connection elements of one of the components and external connection elements of the other of the components. An integrated connection device is formed on at least one of the receptacle components. Each of the receptacle components comprises an injection molded part formed from injection molded polypropylene or polyamide reinforced with glass fibers contained in an amount of approximately 35%-70% by weight and having a length of about 10 mm. At least in the receptacle component which includes the interior connection elements, a transition from an interior bottom wall of the receptacle component to an internal circumferential wall thereof located adjacent the interior connection elements is formed such that a harmonious shape without any kinks or under cut portions is obtained. The resulting structure has sufficient resistance to high temperatures and internal pressures to permit its use as a drying-agent receptacle of a vehicular air-conditioning system.

Long-fibre reinforced thermoplastic material can be processed by means of injection-moulding methods at a reasonable price, the shapes of the receptacle components being freely selectable within wide limits as far as the space which is available for installing the receptacle in a vehicle is concerned. Surprisingly enough, long-fibre reinforced thermoplastic material processed in accordance with an injection moulding method fulfills, when used in combination with the special shape of the wall transition, the demands with regard to pressure and temperature resistance which have to be fulfilled by such drying-agent receptacles. The harmonious shape of the transition avoids the step or the undercut portion between a circumferential wall and the bottom which frequently exists in the case of conventional drying-agent receptacle concepts and in view of which the drying-agent receptacle consisting of a long-fibre reinforced thermoplastic material easily breaks under the influence of pressure and temperature. The new drying-agent receptacle is characterized by its simple and economical production, even if individual shapes are to be produced, by low weight as well as by long durability. An additional important advantage is the ecologically desirable reusability of the material of the drying-agent receptacle. Long-fibre reinforced thermoplastic material is a new fibre composite, which, processed by means of injection-moulding methods, has hitherto only been recommended as a substitute for metal components which have to fulfil high demands with regard to toughness and stiffness even at higher temperatures. For pressure containers this fibre composite has not been recommended.

For practical use, a fibre composite containing 35 to 70% by weight of glass fibres having a length of approx. 10 mm is recommended. This fibre composite is sold under the trade name "Celstran" by the firm of Hoechst AG (registered trade mark of the firm of Hoechst) with different settings, and it can be processed without any difficulties by injection moulding machines operating at an injection pressure of more than 130 t and with intentionally low processing parameters, such as screw speed, dynamic pressure and injection speed. In this long-fibre composite, the long glass fibres are chemically coupled to the heat-stabilized polypropylene or polyamide matrix so as to realize a particularly high toughness and stiffness even at higher temperatures. The material "Celstran" is described in the data sheets CELSTRAN of the firm of Hoechst AG, registration number 206265/93M4 dated 1993 and 295368/94M4 dated 1994.

In the case of the embodiments according to the present invention, the shape of the transition prevents a kind of notch in the cross-section or rather in the internal circumferential wall in which stress may cause damage or fracture under the influence of pressure or temperature.

In accordance with an alternative embodiment, a varying radius of curvature is advantageous; on the basis of this varying radius of curvature, the stress conditions occurring under the influence of pressure and temperature will no longer entail any problems.

An advantageous shape will also be obtained when the curvature of the transition continues also in the bottom part.

An embodiment which can be produced in an advantageous manner, which is easy to mount and which requires little maintenance includes a screw-thread connection between the receptacle components.

Low production costs can be achieved by integral injection-moulded parts. The finished receptacle components no longer require any reworking which would be worth mentioning.

According to an advantageous embodiment of the present invention, the connection pipes can be attached without any difficulties. The pipe-connection channels can be positioned at random in accordance with the structural requirements which have to be fulfilled by the drying-agent receptacle during future use. It would, for example, be easily possible to position one pipe-connection channel in one receptacle component and the other pipe-connection channel in another receptacle component, both at the locations at which the connection distances for the pipes of the air-conditioning system are as short as possible.

In accordance with another embodiment, a flat internal circumferential wall of the drying-agent receptacle is obtained.

In accordance with another embodiment, the skirt increases the shape-retaining properties of the drying-agent receptacle. Furthermore, the connection area is reinforced and the fastening ears are formed on the skirt in such a way that the fastening of the drying-agent receptacle is simplified.

A turning aid, which is formed on the outer side, is expedient for mounting and maintenance, e.g. for exchanging the content of the drying-agent receptacle.

On the basis of a volumetric capacity of approx. 550 cm$^3$ and an average wall thickness of approx. 5.0 mm, a compact shape of the drying-agent receptacle is obtained in combination with a desirably low weight and a comparatively large volumetric capacity.

BRIEF DESCRIPTION OF THE DRAWING

Embodiments of the subject matter of the present invention will be explained on the basis of the drawings, in which.

DESCRIPTION OF THE PREFERRED EMBODIMENTS

Figure 1:
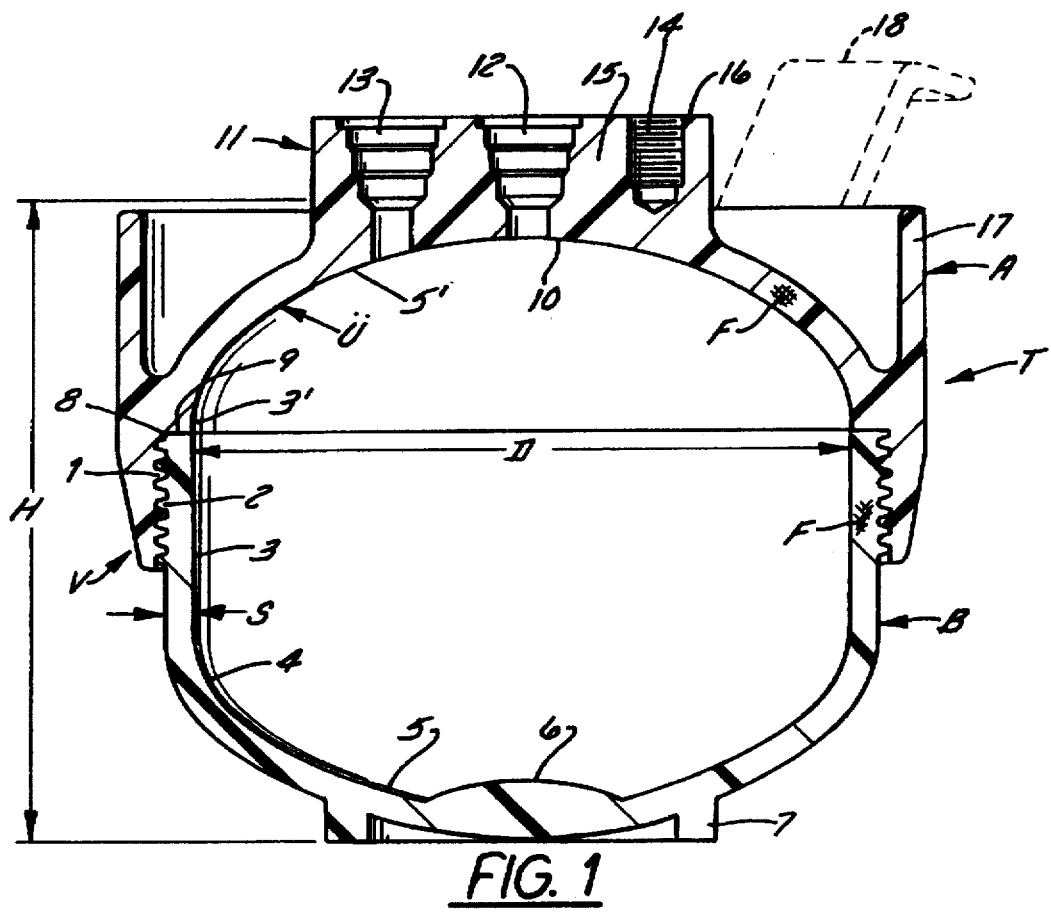
FIG. 1 shows a longitudinal section through a first embodiment of a drying-agent receptacle constructed in accordance with the invention.

A drying-agent receptacle T, in particular for vehicular air-conditioning systems, comprises two semibowl-shaped receptacle components A, B, each of which is formed as an integral part from a long-fibre reinforced thermoplastic material, such as polyamide or polypropylene reinforced with glass fibres having a length of approx. 10 mm (percent by weight of the fibres between 40 and 60% by weight). The long-fibre reinforced thermoplastic material is moulded under a pressure of at least 130 t according to an injection moulding process in an injection moulding machine and has a density between approx. 1.45 to 1.69 g/cm$^3$. The polymer used is polyamide with the setting PA 66 or polypropylene. The receptacle components A, B are connected in a circumferentially extending connection area V, e.g. by means of internal threads and external threads 1, 2. It would also be imaginable to provide a connection in the form of a bayonet lock or to connect the components by means of a tightening strap or the like. Receptacle component B in this embodiment is provided with the external thread 2 extending in the area of an internal circumferential wall region 3 which is approximately parallel to the longitudinal axis of the drying-agent receptacle T. From the internal circumferential wall region 3, a concave curvature (transition 4) leads to a concavely rounded bottom wall portion 5 at the centre of which a convex portion of enlarged thickness 6 is formed. On the outer side of receptacle component B, a turning aid 7, e.g. a hexagon, is provided, the turning aid 7 being formed integrally with the receptacle component B. The wall thickness S of the receptacle components A, B is uniform throughout most of the wall area and amounts e.g. to approx. 4–6 mm. The long fibres F are embedded in polymer so that a fibre skeleton capable of resisting loads is obtained.

Receptacle component A is provided with the internal thread 1 in an inner reception means 8. The reception means 8 extends up to the internal circumferential wall 3' via an approximately radial shoulder 9. From a point of the internal circumferential wall 3' adjacent the shoulder 9, a transition Ü, which is concavely rounded in a harmonious shape and which does not have any undercut portions or angles, extends up to the interior bottom wall 5' which merges with the concave or flat interior bottom 10. In the case of the present embodiment, connection means 11 are formed integrally with receptacle component B, the connections means 11 comprises pipe-connection channels 12 and 13 and of at least one anchoring hole 14 located adjacent said channels. The pipe-connection means 11 are accommodated in a wall portion of enlarged thickness 15 having a flat end surface 16, the wall being enlarged in thickness towards the outer side according to FIG. 1.

Receptacle component A has additionally formed thereon a circumferentially extending skirt 17 having an approximately cylindrical shape and ending below the plane of surface 16 in the case of the embodiment shown. The skirt 17 may, however, be extended such that it extends up to the plane of surface 16 or even beyond said plane. The skirt 17 (according to this embodiment) has provided thereon at least one fastening ear 18, which is formed integrally therewith. The fastening ears 18 could also be formed on the connection means 11.

The drying-agent receptacle T has an interior diameter D of approx. 100 mm and a height H of approx. 100 mm, whereby a volumetric capacity of approx. 550 cm$^3$ is obtained. Its weight is approx. 490 g.

Figure 2:
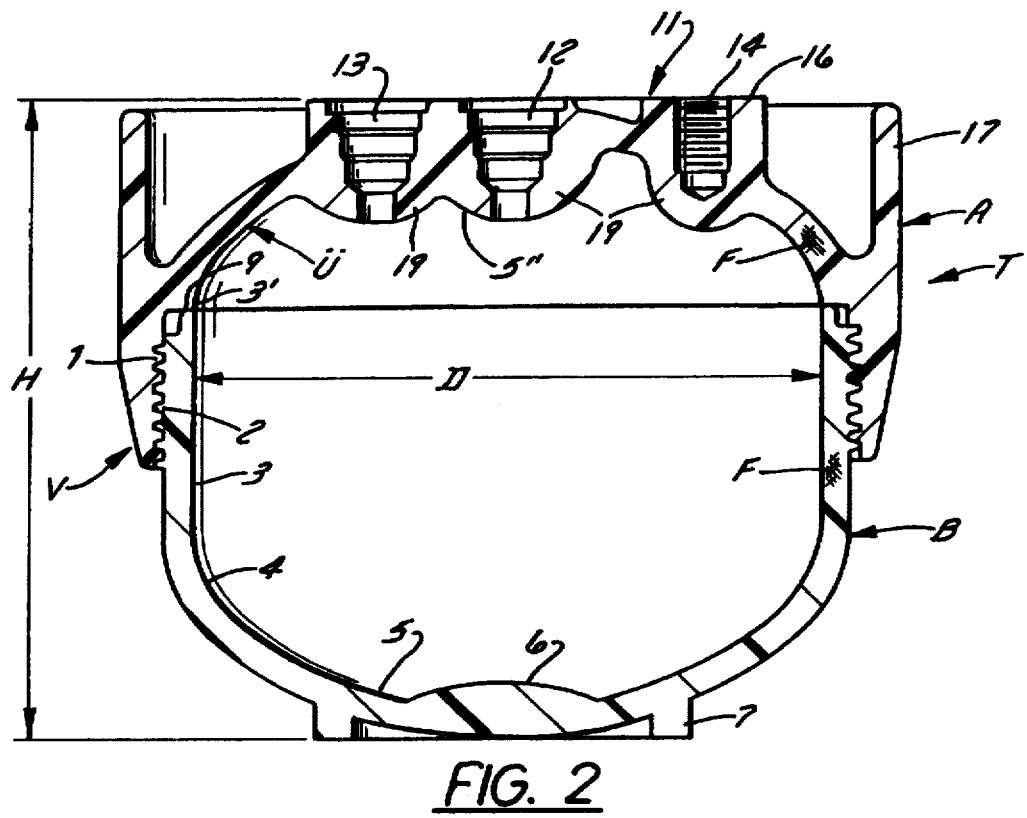
FIG. 2 shows a longitudinal section through another embodiment of a drying-agent receptacle.

The drying-agent receptacle T according to FIG. 2 has a structural design similar to that of the drying-agent receptacle T according to FIG. 1. It differs from the embodiment according to FIG. 1 insofar as the connection means 11 are formed in the receptacle in such a way that a wall portion 19 of enlarged thickness forms elevated areas of concave shape in the bottom wall 5" and insofar as the surface 16 extends approximately on one level with the end of the skirt 17. The internal circumferential wall area 3' and the internal bottom 5" have again formed between them the harmoniously rounded transition Ü. The height H is again approx. 100 mm, and also the interior diameter D is again approx. 100 mm.

For drying-agent receptacles T having a smaller volumetric capacity, a smaller interior diameter D and/or a smaller height H can be chosen. It would definitely be imaginable to provide a basic component (receptacle component A) having an interior diameter of approx. 100 mm and to use receptacle components B of different heights for different volumetric capacities.

Although not shown in the Figures, a sealing means can be introduced between the threads 1, 2. Furthermore, the pipe-connection channels 12 and 13 can be formed in other areas of the wall of the drying-agent receptacle. For example, it would definitely be imaginable to form one channel 13 in one component of the receptacle and the other channel 12 in the other component of the receptacle. Fastening ears 18 are not shown in the case of the drying-agent receptacle T.

I claim:

1. A drying-agent receptacle for a vehicular air-conditioning system, comprising: two receptacle components which are interconnected in a circumferentially extending connection area to define a closed interior which is essentially symmetrical with regard to a longitudinal axis of the drying-agent receptacle, the two receptacle components being interconnected in said circumferentially extending connection area by interior connection elements of one the components and external connection elements of the other of the components, an integrated connection device being formed on at least one of the receptacle components, the receptacle components each comprising an injection-molded part formed from a long-fiber reinforced thermoplastic material, wherein, at least in the receptacle component which includes the interior connection elements, a transition from an interior bottom wall of the receptacle component to an internal circumferential wall thereof located adjacent said interior connection elements is formed such that a harmonious shape without any kinks or undercut portions is obtained, wherein the receptacle components are formed from injection molded polypropylene or polyamide reinforced with glass fibers contained in an amount of approximately 35%–70% by weight and having a length of approximately 10 mm, and wherein said drying-agent receptacle has sufficient resistance to high temperatures and internal pressures to permit its use as a drying-agent receptacle of a vehicular air-conditioning system.

2. A drying-agent receptacle according to claim 1, wherein the transition one of 1) comprises a conical surface widening towards the circumferential wall and 2) corresponds to a section of a sphere widening towards the circumferential wall.

3. A drying-agent receptacle according to claim 1, wherein the transition is concavely curved with a varying radius of curvature.

4. A drying-agent receptacle according to claim 1, wherein an interior bottom wall of said drying-agent receptacle presents a concave curvature continuing the curvature of the transition.

5. A drying-agent receptacle according to claim 1, wherein the external connection element comprises an external thread which is adapted to be screwed into an internal thread forming the internal connection element, said internal thread being formed in an inner reception portion of the receptacle component, said reception portion including a circumferentially extending shoulder which 1) is approximately radial to the receptacle axis, and 2) extends up to the internal circumferential wall of the receptacle component, and wherein the transition at least one of 1) extends up to said shoulder and 2) merges with the internal circumferential wall in spaced relationship with said shoulder.

6. A drying-agent receptacle according to claim 5, wherein the receptacle components are integrally formed with the external and internal threads, the reception portion and the connection device by means of injection molding.

7. A drying-agent receptacle according to claim 1, wherein the connection device comprises 1) a plurality of pipe-connection channels and 2) at least one neighboring anchoring hole which is open only on an outer side thereof, said channels and said hole being formed in wall portions of one of the receptacle component which are locally enlarged in thickness.

8. A drying-agent receptacle according to claim 7, wherein at least one of the thicker wall portions is enlarged in thickness towards an outer side of the receptacle component in which it is formed, and wherein the interior wall of the drying-agent receptacle is one of flat and concavely curved in this area.

9. A drying-agent receptacle according to claim 1, wherein at least the receptacle component equipped with the connection device has provided thereon a circumferentially extending skirt which is formed integrally therewith and which is provided with fastening ears formed integrally therewith and projecting therefrom.

10. A drying-agent receptacle according to claim 9, wherein one of the receptacle components is provided with a turning aid formed on the outer surface thereof.

11. A drying-agent receptacle according to claim 1, wherein the drying-agent receptacle has a volumetric capacity of approximately 550 $cm^3$, an interior diameter of approximately 100 mm in the connection area, and a wall thickness of approximately 5 mm, and wherein the transition is concavely rounded with a radius of approximately 3.5 cm.

* * * * *